United States Patent [19]

DePalma et al.

[11] Patent Number: 5,532,081
[45] Date of Patent: Jul. 2, 1996

[54] UPWARD DEFLECTING SUPPORT DISK FOR ELECTROCHEMICAL CELL SEAL

[75] Inventors: Christopher L. DePalma, Framingham, Mass.; Peter J. Pope, Balcombe, England; Sean A. Sargeant, Westford; Marian Wiacek, Holliston, both of Mass.; Robert A. Yoppolo, Woonsocket, R.I.

[73] Assignee: Duracell Inc., Bethel, Conn.

[21] Appl. No.: 295,313

[22] Filed: Aug. 24, 1994

[51] Int. Cl.$^6$ .................................................. H01M 2/04
[52] U.S. Cl. ........................ 429/171; 429/172; 429/174; 429/185
[58] Field of Search .................................. 429/171, 172, 429/174, 185

[56] References Cited

U.S. PATENT DOCUMENTS

| | | | |
|---|---|---|---|
| 3,218,197 | 11/1965 | Carmichael et al. | 136/133 |
| 3,219,488 | 11/1965 | Southworth | 136/133 |
| 4,075,398 | 2/1978 | Levy | 429/56 |
| 4,476,200 | 10/1984 | Markin et al. | 429/56 |
| 4,537,841 | 8/1985 | Wiacek et al. | 429/56 |
| 5,080,985 | 1/1992 | Wiacek et al. | 429/172 |
| 5,150,602 | 9/1992 | Payne et al. | 29/623.2 |
| 5,227,261 | 7/1993 | Georgopoulus | 429/56 |

*Primary Examiner*—John S. Maples
*Assistant Examiner*—Richard H. Lilley, Jr.
*Attorney, Agent, or Firm*—Ronald S. Cornell; Robert J. Feltovic; Barry D. Josephs

[57] ABSTRACT

A metal support disk for an electrochemical cell seal exerts a resilient outward radial force against the seal to maintain seal integrity over a wide range of operating temperature and, at the same time, exerts an upward force against the bottom of the metal end cap terminal of the cell to assure electrical contact between the anode inside the cell and the terminal. The disk includes a central, circular platform connected to an outer, sealing edge sealing flange by an annular flexure means which permits radially inward and outward movement of the sealing edge when the end of the cell is radially crimped during the sealing process. The crimping also moves the central portion of the disk up which results in the upward force being exerted against the end terminal. The flexure means is a sequential series of three annular, curved fibs with the first and third curved downward and the second curved upward. A ring depending radially outward and at an upward angle from the first fib connects the first fib to the second fib and helps to prevent plastic deformation of the disk during sealing.

33 Claims, 2 Drawing Sheets

UPWARD DEFLECTING SUPPORT DISK FOR ELECTROCHEMICAL CELL SEAL

BACKGROUND OF THE INVENTION

1. Field of the Invention

This invention relates to an upward deflecting metal support disk useful in a seal for an electrochemical cell. More particularly, this invention relates to an electrochemical cell, such as a primary alkaline cell, sealed at one end with a seal containing a support disk which exhibits a resilient outward radial force against the seal and deflects slightly upward when radially compressed during the sealing process, to assure seal integrity and a positive electrical contact with the metal end cap terminal of the cell.

2. Background of the Disclosure

Electrochemical cells, such as alkaline primary cells, are made by filling a metal can open at one end and closed at the other end, with the electrochemically active ingredients, inserting a seal assembly in the open end and then crimping to seal the cell. The seal assembly includes a disk of plastic or metal as a support against which the seal is made to prevent leakage of the cell's internal chemical components. Therefore, the support disk must be strong enough to make a seal without being crushed during the sealing step of the manufacturing process. Seals employing a rigid metal disk do not contract and expand through temperature variations in a manner which maintains an even pressure on the seal. This is due to the differences in the thermal expansion and contraction characteristics of the metal can, the different materials employed in the seal, including the metal support disk, manufacturing tolerance variables which can not be avoided and creep of the plastic seal member. As a result, such cells are prone to leakage. Similarly, if the support is thick plastic, the large seal area results in a lower pressure exerted on the seal. An example of such a fairly rigid type of plastic support is disclosed, for example, in U.S. Pat. No. 5,227,261. More recently, there have been efforts to develop a more resilient seal for an electrochemical cell. These efforts have resulted in the development of a seal assembly which includes an electrically nonconductive, plastic seal member, a metal support disk, a current collector and a metal end cover or cap which serves as one terminal of the cell. The metal support disk permits the cell to be sealed by a crimping step which exerts radially inward forces to the seal assembly and which radially compresses the support to a small extent. The member which achieves the actual seal is generally disk or wheel-shaped and is fabricated as a single piece of injection molded plastic, although some assemblies have employed two or more plastic members to achieve the seal. Illustrative, but non-limiting examples of seal assemblies employing a plastic seal member, metal support disk, current collector and metal end cap terminal and their use with electrochemical cells are disclosed, for example, in U.S. Pat. Nos. 4,537,841 and 5,080,985. However, there is still a need for a seal having a support disk which will maintain a fairly uniform and constant pressure on the seal over the anticipated temperature range through which the cell may be in service, in order to maintain seal integrity and at the same time insure that electrical contact with the end cap terminal is maintained.

SUMMARY OF THE INVENTION

The present invention relates to a support disk useful in sealing an electrochemical cell, such as a primary alkaline cell, wherein the disk exerts a resilient outward radial force against the seal and deflects slightly upward when radially compressed during the sealing process to assure seal integrity and a positive electrical contact with the metal end cap terminal of the cell. The disk includes a central portion connected to an outer edge sealing means by an annular flexure means which acts as a resilient spring so that, after the disk has been slightly compressed radially inward during the cell sealing process, the outer edge of the disk maintains a resilient, radially outward force against the seal thereby assuring seal integrity over the life of the cell. The sealing means of the disk is below the plane of the central portion. The disk terminates radially outward at its periphery in a flange having a free outer edge which comprises the actual sealing means, with the outer, free edge of the flange pressing radially outward against a separate sealing member disposed between it and the inner wall of the cell casing to form the seal. The flexure means flexes or moves radially inward when a radial compressive force is applied to the outer periphery of the support disk. In a preferred embodiment, this radially inward movement is elastic. This means that the deformation of the flexure or spring means is within the elastic limit of the material from which the disk is fabricated so that elastic and not plastic deformation occurs. If plastic deformation of the support occurs, the edge of the support will still exert a resilient outward radial force against the seal, but not in an amount as great as it would have been if only plastic deformation of the support had occurred. The flexure means comprises a sequential series of annular, curved ribs or rings circumferentially depending from the central portion of the disk and terminating at the outer seal means. In one embodiment the flexure means comprises a sequential series of three annular, curved ribs or rings circumferentially depending from the central portion of the disk and terminating in an outer flange. In this embodiment the first and third ribs are curved downward and the second rib is curved upward, so that a cross-sectional profile appears somewhat like a sequential series of two shallow S-shaped curves. In other embodiments the invention relates to an electrochemical cell seal assembly employing the support disk of the invention, a plastic seal member, a current collector and an end cap terminal, and also to an electrochemical cell containing the support disk.

When the cell is sealed, a radially inward compressive force is circumferentially applied to the outer periphery of the flange which permanently compresses the support disk radially inward and also urges the central portion of the disk upward against an adjacent metal end cap terminal. After the cell is sealed, the outer edge of the flange continues to exert a resilient, circumferentially radially outward force against the cell seal to insure seal integrity throughout the life of the cell over the desired operating temperature range for the cell which, for an alkaline primary cell, will generally be in the range of from about −30° to +80° C. The upward deflection of the support disk helps to maintain an electrical contact between the support, or an anode current collector connected to the support, and an adjacent metal end cap which serves as one of the cell terminals.

DETAILED DESCRIPTION

Figure 1A:
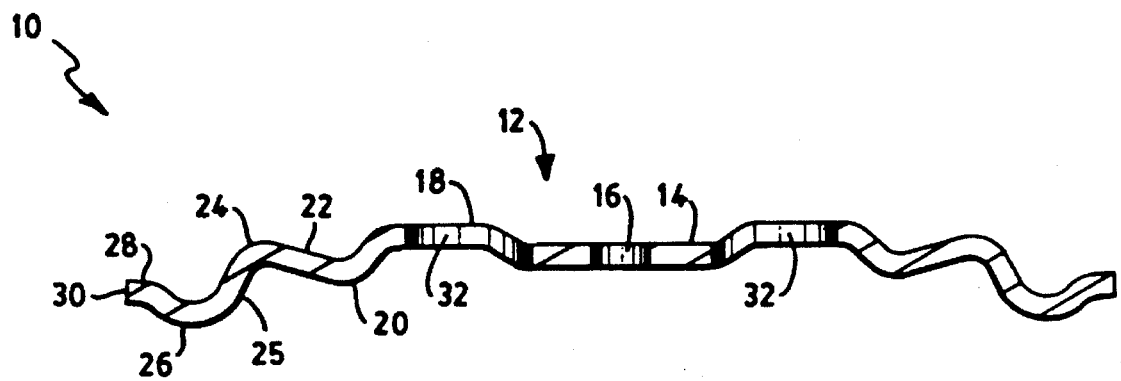
FIGS. 1(a) and 1(b) illustrate a schematic cross-sectional view and a partial perspective view, respectively, of a support disk of the invention.
Figure 1B:
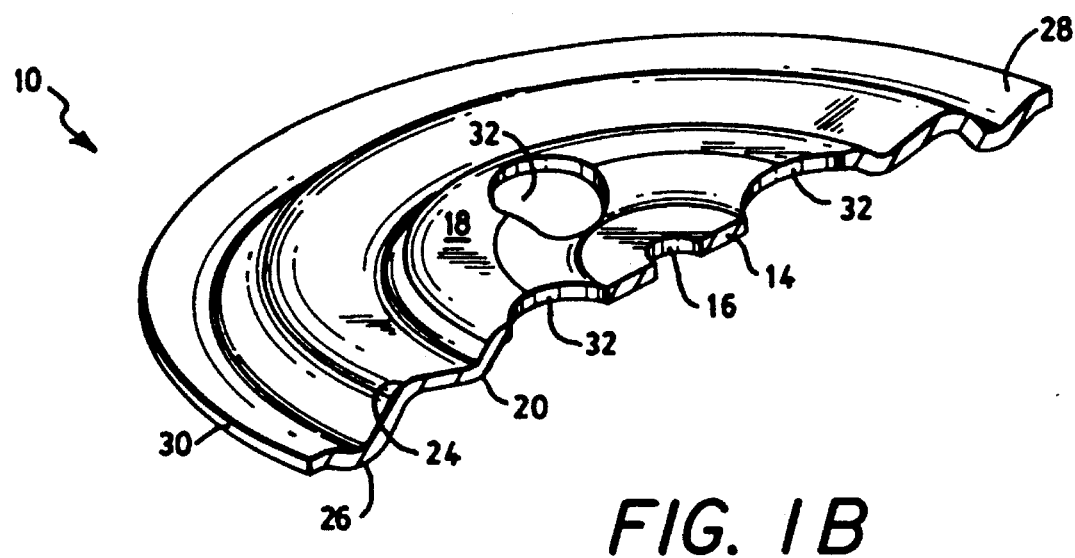
Figure 2:
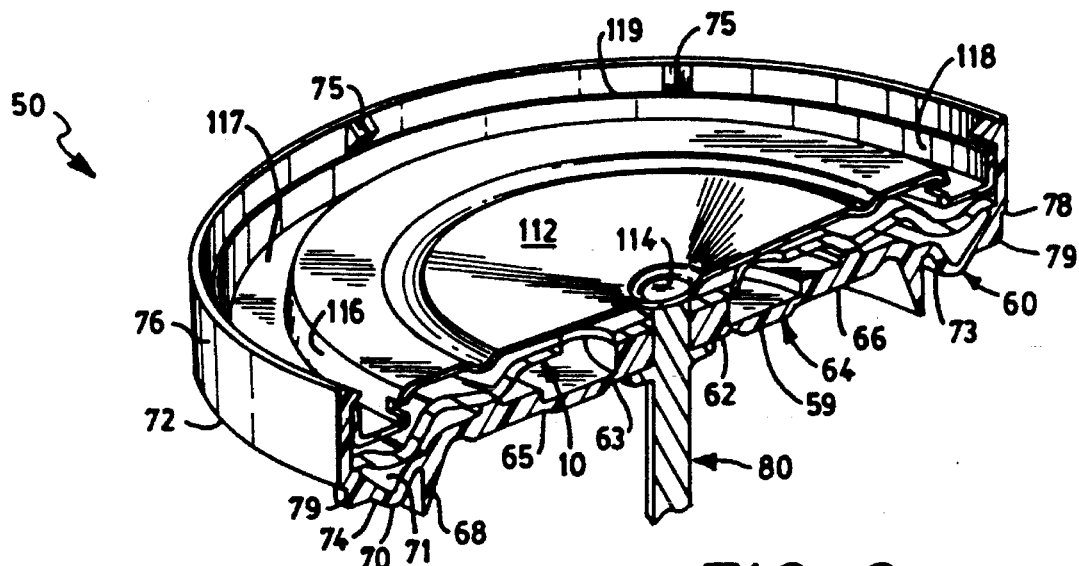
FIG. 2 is a cut-away view, in perspective, of a seal assembly for an electrochemical cell which employs a support disk of the invention.
Figure 3:
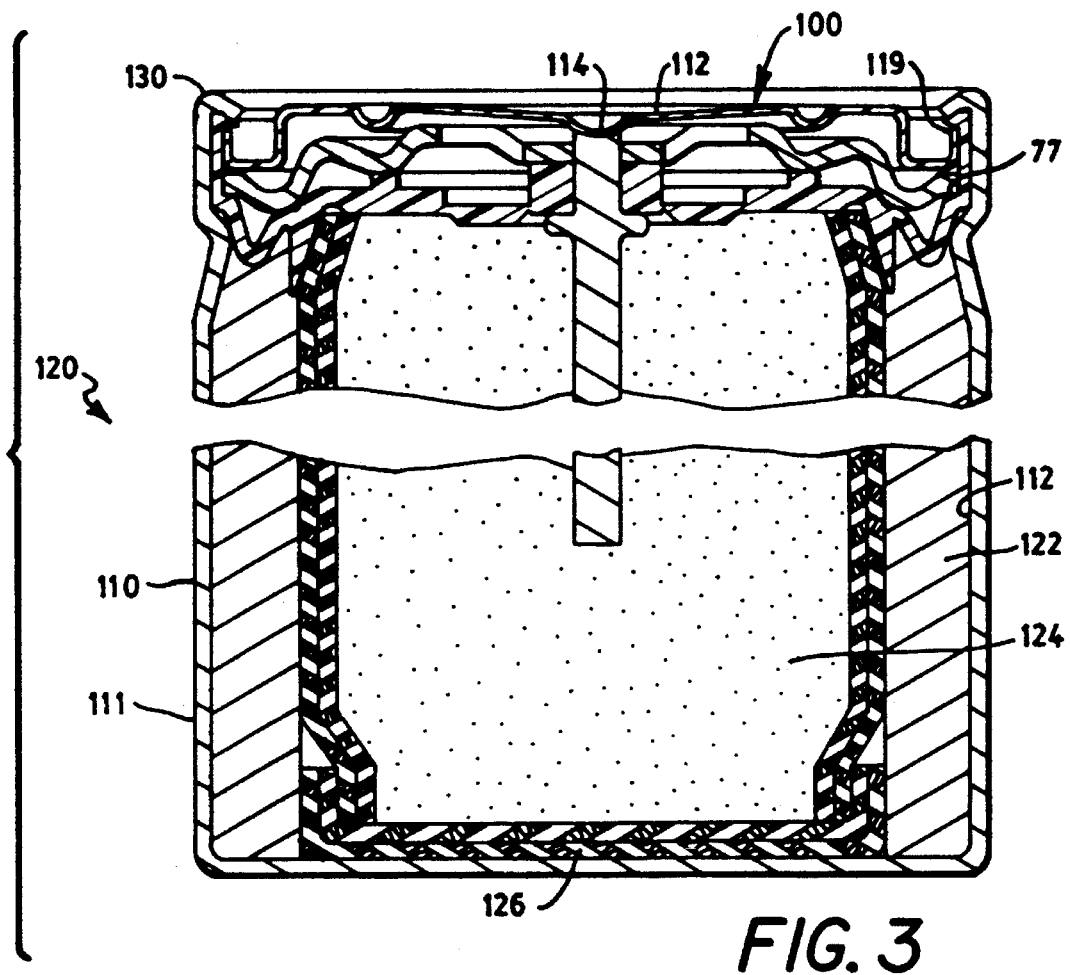
FIG. 3 schematically illustrates a cross section of an alkaline cell having a seal which employs a support disk of the invention.

Referring to FIGS. 1(a) and 1(b), a support disk 10 of the invention is shown as being of a unitary construction and comprising a central disk 12 which includes an inner or central annular platform 14 having an axial bore 16 and which terminates at its periphery in a raised ring 18. Annular ribs or rings 20, 24 and 26, comprising the flexure or spring means, sequentially depend from ring 18. Flange 28 depends from the periphery of the flexure means via the periphery of rib 26. Flange 28 extends radially outward, terminating in a free edge 30. The cross-sectional profile of the flexure means comprising the three annular ribs or rings 20, 24 and 26 is seen to appear somewhat as a sequence of two shallow, S-shaped curves. Also, ribs 20 and 26 curve downwardly, while rib 24 curves upwardly. Ring 22 which connects ribs 20 and 24 is shown as depending from rib 20 at an upward angle with respect to the general horizontal plane of the support disk. This is an important feature of the invention in that it enables the tensile stress imparted to the flexure means by compressive stress applied to the edge 30 at the periphery of the support disk to be distributed over the three ribs 20, 24 and 26. It has been found that if ring 22 is not angled upwardly as shown, but is relatively horizontal, then the compressive force applied to edge 30 when the cell is sealed will cause plastic deformation of the flexure means at rib 24 or 26, depending on their angles of curvature. This means that the radius of curvature of either rib 24 or 26 is decreased plastically instead of elastically, while still under the compressively induced stress. The net result is that edge 30 will exert less force radially outward on the seal than if only, or primarily, elastic deformation occurs. In the embodiment shown, the upward angle is generally between 10 to 20 degrees. Free edge 30 of support 10 is shown as below the plane of ring 18. This is necessary in order for central annular platform 14 to be urged upward when a radial compressive force is applied to edge 30. Annular platform 14 contains a hole or bore 16 in its center for accommodating a current collector as shown in FIGS. 2 and 3 and, in this embodiment, is depressed slightly below the top of ring 18 to accommodate protrusion of one end of the current collector without having to increase the space over the support when used in a cell as shown in the Figures. A radially inward force circumferentially applied to the edge 30 of support 10 via a crimp sealing process urges the top portion upward instead of downward as is the case with the support disclosed in U.S. Pat. No. 5,080,985. As set forth above, a radial compressive force circumferentially applied to the outer periphery 30 of flange 28 during the crimp sealing process compresses the flange radially inward. This causes rim 26 to bend radially inward at its lower portion which tends to tilt ring 22 upward which results in an upward force being applied to the central portion 12. Crimp sealing processes which exert a radially inward compressive force are known to those skilled in the art and are disclosed, for example, in U.S. Pat. Nos. 5,080,985 and 5,150,602. It is preferred that the support member undergo elastic and not plastic deformation during the sealing process in order to maintain the maximum radially outward resilient force against the actual seal that is possible with the material from which the seal is fabricated.

The upward urging of the top of the support helps to insure that physical contact and concomitant electrical contact of the upper portion of current collector 80 with the metal end cap terminal 100 shown in FIGS. 2 and 3 will be maintained during the lifetime of the cell. In an alternate embodiment, ring 18 of the support disk can make the physical and electrical contact with the metal end cap terminal 100 instead of the upper portion of the current collector as is disclosed, for example, in the '985 and '602 patents. Thus, the invention is not intended to be limited to the particular embodiment shown in the Figures. A plurality of vent holes 32 are shown in this embodiment as a means for permitting gas to escape in a cell in which the support disk is used, as those skilled in the art will know. Disk 10 can be made of any suitable resilient material and particularly a metal such as cold rolled steel, stainless steel and the like, with the choice of material being left to the discretion of the practitioner and the particular design of the cell in which it is to be used. For example, in a cell design in which the electrically conductive current collector which makes physical and electrical contact with the metal end cap terminal, it will be possible to use an electrically nonconductive support. On the other hand, when the support itself must make the mechanical and concomitant electrical contact with the metal end cap, then the support must be made of metal or other suitable electrically conductive material as will be appreciated by those skilled in the art. In the embodiment described below for a typical D cell, the support disk of the invention is stamped from cold rolled steel 28 mils or 0.7 mm thick, which has been found to be a relatively facile and economical method and material for the support disk, and ring 22 depends from the bottom of rib 20 at an upward angle of about 15 degrees.

FIG. 2 is a cut-away view, in perspective, of a cell seal assembly employing a support of the invention, which in this embodiment is for an alkaline, size D cell. FIG. 3 schematically illustrates a cross section of an alkaline D cell, one end of which is sealed with the said seal assembly by crimping. FIG. 2 illustrates a preferred embodiment in which the seal assembly 50, including the support 10 of the invention, is preassembled as an integrated part which can be handled as a single element during cell assembly. Referring to FIGS. 2 and 3, seal assembly 50 is shown as including a metal support member 10 of the invention, a molded plastic seal member 60, a metal current collector 80 and a metal cap 100 which also functions as one of the electrical terminals of the cell. In this embodiment, cap 100 is the negative cell terminal. Metal current collectors are commonly referred to by those skilled in the art as nails and such types of current collectors may be used in the practice of the invention if desired. In the embodiment illustrated and described herein, the metal current collector is more like a rivet than a nail. Plastic seal member 60 is shown as generally disk or wheel-shaped having a unitary construction with a centrally located cylindrical hub 62 from which circumferentially depend, in outward radial sequence, an annular vent 64, followed by an annular boss 66, a downwardly projecting skirt 68, annular spring or flexure means 70, and terminates in an upwardly extending cylindrical rim or wall portion 72 at the outer periphery. Hub 62 has an axial bore as shown, through which projects the upper portion 120 of current collector 80 which in this embodiment is peened or riveted at its top to secure support 10 to the plastic seal member. In the embodiment shown, annular vent 64 is generally planar and comprises a thin membrane 63 as a ring at its inner edge by which it depends from, and is attached to, hub 62 and diaphragm 59; a thicker, annular diaphragm 59, and a hinge member 65 as a ring around its outer edge by which it is attached to annular boss 66. Boss 66 is illustrated as a relatively thick ring. It functions to prevent ballooning of the seal member under cell pressure by its upper surface contacting the lower surface of the annular ring portion 24 of support disk 10. Skirt 68 depends from the outer portion of boss 66 and extends downwardly to prevent mixing of the anode and cathode components of the cell (e.g., an alkaline cell) as is illustrated in FIG. 3. Spring means 70 of seal member 60 circumferentially depends radially outward from the skirt 68 and includes annular V-shaped channel 71 formed by walls 73 and 74. Finally, upwardly extending rim 72 depends from the upper portion of wall 74 and contains a plurality of lugs 75 extending radially inward on the interior surface of its upper portion 76 for positively securing a metal end cap 100 within so that the seal assembly can be handled as a single integrated unit during assembly of the cell. Circumferential shoulder 77 on the interior surface of rim 72 serves to support the edge of metal support disk 10 during crimping. Illustrative, but non-limiting examples of materials suitable for use in fabricating the plastic seal member 60 include nylon, nylon alloys, polysulfone and filled polypropylene, as is known to those skilled in the art and is disclosed, for example, in the '595 patent, the disclosure of which is incorporated herein by reference.

During assembly, cap 100 is placed on top of the lugs and pressed or snapped past the lugs and down into the cavity defined by the cylindrical wall of rim 72. A plurality of ribs 79 are shown extending radially outward of the exterior surface on the upper portion of wall 74 and downward from the bottom, exterior shoulder 78 of rim 72. These ribs permit the seal assembly to be inserted into the top of the cylindrical metal container which serves as the positive cell terminal, while at the same time permitting entrained air to escape as the seal assembly is placed in the can to avoid "pumping" of the electrolyte out of the can during assembly. These ribs are dimensioned so as to achieve a slight interference fit with the corresponding internal cell wall 112 as illustrated in FIG. 3, so that the seal assembly is held in position in the cell container during assembly and crimping operations. While this particular design of a seal means is a preferred embodiment, those skilled in the art will appreciate that other designs may be employed for the seal means, illustrative, but non-limiting examples of which include those types described in the '985 and '602 patents.

When the seal is formed by crimping, radial edge 30 of support 10 bites into the interior portion of rim or wall 72 of the seal member 60 as shown in FIGS. 2 and 3. It is preferred that the edge 30 of the support compress the rim wall 76 of the seal member 60 in an amount of at least 25% of the wall thickness in order to achieve a good seal. As stated above, the metal support 10 is designed as illustrated so that the edge exhibits a spring-like resiliency and exerts a radially outward compressive force on the seal member wall which is maintained over the life of the cell to assure that the seal is maintained over a wide temperature range (e.g., about −30° to +80° C.). Also, it will be appreciated that flexure means 70 permits the rim of the seal member to move radially inward and outward during assembly and crimping operations, and also during temperature fluctuations, without affecting the rest of the base of the seal, including the pressure vent.

Shoulder 78 on the bottom of rim 72 is shown in FIG. 3 as supporting the seal assembly in the cell 120 by resting on the interior circumferential shoulder crimped into the metal can 110 which forms the container of the cell. Metal end cap 100 which forms the negatively charged anode terminal of cell 120 is illustrated in this embodiment as a metal disk having a planar central disk portion 112 which slopes slightly downward at its center towards its center at which is centrally located a downwardly protruding dimple 114. A relatively shallow cylindrical portion 116 depends downward from the outer periphery of 112, with a flange 117 depending from the bottom of 116, extending radially outward and terminating at its outer periphery in an upward extending rim 118 having a circumferential outer edge 119. As with the seal means described above, this particular end cap construction is a preferred embodiment which is not intended to be limiting with respect to the practice of the invention. Thus other end cap designs may be employed such as that illustrated in the '985 patent.

Seal assembly 50 is shown in FIG. 3 as crimp sealed into the upper end of cell 120 by a permanent bend 130 circumferentially formed in the upper end of the metal cell wall. The crimp forces the cell wall against the outer surface of rim 76 of plastic seal member 60 and bends them both together down and over the edge 119 of metal cap 100 to seal the cell. At the same time an inward radial force is circumferentially applied to the outer edge 30 of support 10 during the crimping operation which results in a permanent upward deflection and force applied to the central part of the support, helping to insure a permanent physical and electrical contact between the upper end of the current collector and the dimple in the end cap 100. Metal anode current collector or rivet 80 is shown with the top of its upper portion peened or riveted over onto the metal support 10 which secures it firmly in place against the top of hub 62. Upward movement of the current collector is prevented by flange 122. The planar upper portion of the end cap is shown in FIG. 3 as being dished downwards towards the center for the sake of illustrating the construction of the cap prior to crimping. However, during the crimping and sealing operation, a radial inward force is applied to the side of the seal assembly which, in this preferred embodiment, results in the assembly being permanently compressed inward. This in turn causes the upper portion of the support to be deflected slightly upward, with the upper end of the current collector permanently pushing the dimple up so that the upper planar portion of end cap terminal is permanently flat. This also results in a permanent upward force by the upper end of the current collector on the dimple which assures a permanent mechanical and concomitant electrical connection between the metal current collector and end cap during the life of the cell.

Cell 120 in FIG. 3 is meant to be representative of a typical D size alkaline cell having a gelled zinc anode and a $MnO_2$ cathode. As is known to those skilled in the art, inside cell 120, an $MnO_2$ cathodic material 122 is in contact with the interior surface of metal can 110 and is separated from a gelled zinc anode material 124 by means of electrically nonconductive membrane 126 which also prevents the anodic material from contacting the bottom of the can. Skirt 68 of plastic seal member 60 overlaps the separator and prevents the anodic and cathodic materials from mixing in the cell. Current collector 80 extends into the anodic material as shown in FIG. 3 and thereby makes an electrical connection between the gelled zinc anode and the metal end cap terminal.

It is understood that various other embodiments and modifications in the practice of the invention will be apparent to, and can readily made by, those skilled in the art without departing from the scope and spirit of the invention disclosed above. Accordingly, it is not intended that the scope of the claims appended hereto be limited to the description set forth above, but rather that the claims be construed as encompassing all of the features of patentable novelty which reside in the present invention, including all features and embodiments which would be treated as equivalents thereof by those skilled in the art to which the invention pertains.

What is claimed is:

1. A support useful in sealing an electrochemical cell comprises a generally planar disk having a central, circular platform connected to an outer sealing edge by an annular flexure means which permits radial inward and outward movement of said edge, said flexure means comprising a sequence of concentric, annular, curved ribs, wherein adjacent ribs have different curvature and wherein at least two adjoining ribs are connected by a ring angled upward from the plane of said disk.

2. A support of claim 1 wherein the outer periphery of said ring is higher with respect to said plane of said disk than its inner periphery.

3. A support of claim 2 in which the plane of said sealing edge is below the plane of said platform.

4. A support of claim 3 in which said flexure means includes three said ribs.

5. A support of claim 4 in which said first and third ribs are curved downward and said second rib curves upward.

6. A support of claim 5 in which said first rib depends from the periphery of said platform.

7. A support of claim 6 in which said first and second ribs are connected by said ring.

8. A support of claim 7 in which said ring extends at an upward angle from the periphery of said first rib.

9. A support of claim 8 in which said angle ranges from about 10 to 20 degrees.

10. A metal support of unitary construction useful in sealing an electrochemical cell, said support comprising a generally planar disk having a central, circular platform connected to a flange having a sealing edge at its outer periphery by an annular flexure means comprising a sequence of concentric, annular, curved ribs, wherein adjacent ribs have different curvature and at least two adjoining ribs are connected by a ring angled upward from the plane of said disk and wherein said edge is below the plane of said platform, whereby said edge exerts a radially outward force and said platform is urged upward when a radially inward compressive force is circumferentially applied to said edge.

11. A seal assembly for sealing an electrochemical cell comprises a circular plastic sealing member having its outer periphery defined by a rim including a wall and a support disk attached to said member by a metal current collector which extends axially through the center of said member and disk, said disk being within said wall of said sealing member and comprising a generally planar disk having a central, circular platform connected to an outer sealing edge by an annular flexure means comprising a sequence of concentric, annular, curved ribs, wherein adjacent ribs have different curvature and at least two adjoining ribs are connected by a ring angled upward from the plane of said disk and wherein said edge is below the plane of said platform, whereby said flange exerts a radially outward force and said platform is urged upward when a radially inward compressive force is circumferentially applied to said flange.

12. A seal assembly of claim 11 further including a circular metal end cap terminal.

13. A seal assembly of claim 12 in which said end terminal is disposed within said wall of said sealing member and adjacent said support disk.

14. A seal assembly of claim 13 wherein said support disk is metal.

15. An electrochemical cell comprising a cylindrical container crimp sealed at one end with a seal assembly which comprises a circular plastic sealing member having its outer periphery defined by a wall generally perpendicular to the plane of said member, a metal support disk adjacent to said member and a current collector, said disk being within said wall and comprising a generally planar disk having a central, circular platform connected to an outer sealing edge by an annular flexure means comprising a sequence of concentric, annular, curved ribs, wherein adjacent ribs have different curvature and at least two adjoining ribs are connected by a ring angled upward from the plane of said disk and wherein said edge is below the plane of said platform.

16. A cell according to claim 15 wherein said crimp seal results in said support disk being compressed radially inward at said edge and wherein said edge exerts a resilient, radially outward force against the interior wall surface of said plastic sealing member and presses it against the interior wall surface of said cylindrical container to form a seal.

17. A cell according to claim 16 wherein said support disk is elastically and not plastically compressed.

18. A cell according to claim 16 wherein said current collector extends axially through the center of said member and disk.

19. A cell according to claim 18 wherein said support disk is attached to said sealing member by said current collector.

20. A cell according to claim 19 further including a circular metal end cap terminal disposed within said wall of said sealing member and adjacent said support disk.

21. A cell according to claim 20 wherein said metal end cap terminal makes physical and electrical contact with said current collector.

22. A cell according to claim 20 wherein said metal cap makes physical and electrical contact with said support disk.

23. A cell according to claim 15 wherein said support disk and said sealing member cooperate to prevent ballooning of said seal member under cell pressure.

24. An electrochemical cell comprising a cylindrical metal container closed at one end and crimp sealed at its other end with a seal assembly which comprises a wheel shaped plastic sealing member having a central bore and an outer periphery defined by an upward extending wall, said assembly further including a metal support disk attached to said member by a metal anode current collector which extends axially through the center of said disk and said bore of said member, said assembly further including a circular metal end cap terminal disposed within said wall of said sealing member and adjacent said support disk, wherein said support comprises a generally planar disk having a central, circular platform connected to an outer sealing edge by an annular flexure means comprising a sequence of concentric, annular, curved ribs, wherein adjacent ribs have different curvature and at least two adjoining ribs are connected by a ring angled upward from the plane of said disk and wherein said edge is below the plane of said platform, wherein said crimp seal results in said support disk being compressed radially inward at said edge, whereby said edge exerts a resilient, radially outward force against the interior wall surface of said plastic sealing member and presses it against the interior wall surface of said circular container to form a seal and said central portion of said support is urged upward to make mechanical and electrical contact between said current collector and said end terminal.

25. A support of claim 24 wherein the outer periphery of said ring is higher with respect to said plane of said disk than its inner periphery.

26. A support of claim 25 in which the plane of said sealing edge is below the plane of said platform.

27. A support of claim 26 in which said flexure means includes three said ribs.

28. A support of claim 27 in which said first and third ribs are curved downward and said second rib curves upward.

29. A support of claim 28 in which said first rib extends from the periphery of said platform.

30. A support of claim 29 in which said first and second ribs are connected by said ring.

31. A support of claim 30 in which said ring extends at an upward angle from the periphery of said first rib.

32. A support of claim 31 in which said angle ranges from about 10 to 20 degrees.

33. A support of claim 24 wherein said support disk and said sealing member cooperate to prevent ballooning of said member under cell pressure.

* * * * *